(12) United States Patent
Furrow et al.

(10) Patent No.: US 6,503,007 B1
(45) Date of Patent: Jan. 7, 2003

(54) PRINTER RIBBON MOTION DETECTION SYSTEM

(75) Inventors: Edward D. Furrow, Waynesboro, VA (US); Paul W. Snyder, Waynesboro, VA (US); Gerald A. Bradfield, Waynesboro, VA (US)

(73) Assignee: Genicom, LLC, Chantilly, VA (US)

( * ) Notice: Subject to any disclaimer, the term of this patent is extended or adjusted under 35 U.S.C. 154(b) by 0 days.

(21) Appl. No.: 09/916,914

(22) Filed: Jul. 27, 2001

(51) Int. Cl.[7] .......................... B41J 32/00; G01P 13/00; G01D 5/12
(52) U.S. Cl. ...................... 400/208; 347/214; 400/247; 400/719; 324/207.11; 324/207.13; 324/207.2; 324/207.24; 340/673; 340/675
(58) Field of Search ...................... 324/207.11, 207.13, 324/207.2, 207.22, 207.24, 207.25; 340/673, 675; 347/214; 400/207, 208, 247, 719

(56) References Cited

U.S. PATENT DOCUMENTS

| 4,212,552 | A |  | 7/1980  | Bemis et al. |
| 4,213,575 | A |  | 7/1980  | Firth et al. |
| 4,925,121 | A |  | 5/1990  | Tapscott et al. |
| 4,986,679 | A |  | 1/1991  | Kawaura et al. |
| 5,755,519 | A |  | 5/1998  | Klinefelter et al. |
| 5,826,991 | A |  | 10/1998 | Pham et al. |
| 6,082,914 | A |  | 7/2000  | Barrus et al. |
| 6,229,299 | B1 | * | 5/2001  | Strashny ..................... 324/174 |
| 6,279,406 | B1 | * | 8/2001  | Li et al. .................. 73/861.77 |

FOREIGN PATENT DOCUMENTS

| EP | 684454 | * | 11/1995 | ............ G01D/5/14 |
| EP | 933617 | * | 8/1999  | ............ G01D/5/22 |
| JP | 6-160411 | * | 6/1994  | ............ G01P/13/00 |

* cited by examiner

*Primary Examiner*—Huan Tran
(74) *Attorney, Agent, or Firm*—Parker & DeStefano; Sheldon H. Parker; Kimberly O. Snead

(57) ABSTRACT

A motion detector comprising a rotator member having at least one radially positioned member and being mounted for rotation from at least a first position to at least a second position; a detector member, preferably a Hall Effect sensor; and a magnet producing a magnetic field; wherein, the radially positioned member is characterized by altering the magnetic flux of the magnetic field when it moves into and out of proximity to the magnet; and wherein the detector member detects the alteration of the magnetic flux. The motion detector is preferably used to detect the speed, type, position, presence, and absence of a printer ribbon cartridge.

44 Claims, 6 Drawing Sheets

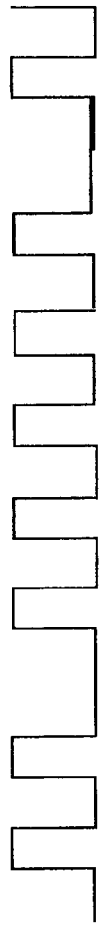
Figure 4
Figure 3
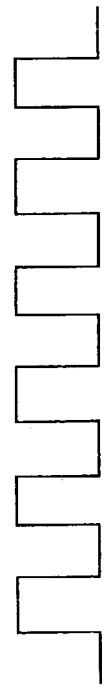
Figure 2
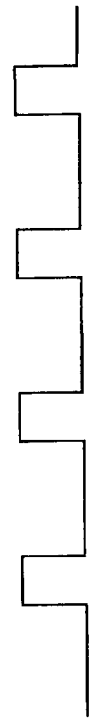
Figure 1
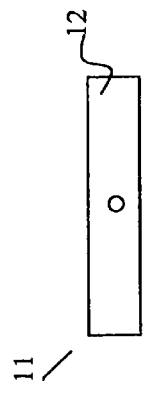
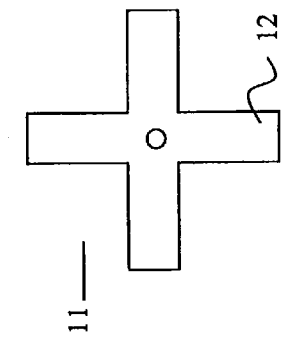
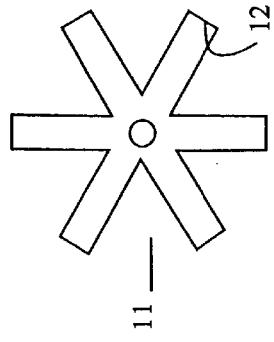
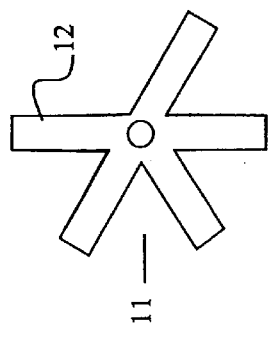

PRINTER RIBBON MOTION DETECTION SYSTEM

BACKGROUND OF THE INVENTION

1. Field of the Invention

The present invention relates to print ribbon delivery systems for printers, and more particularly, to a system for detection of motion of the ribbon in a ribbon cartridge.

2. Description of the Prior Art

Detection of ribbon motion is important for at least three reasons: 1) If the ribbon has stalled, the ink in the ribbon will be rapidly depleted and print information will be lost, 2) A ribbon stall condition may be an indicator of a mechanical failure of the ribbon cartridge or transport system, indicting that a repair is needed, or 3) The ribbon has become hung in the wires of the print head, in the case of an impact printer, and that the print head may already be, or may become, damaged.

Previous means for sensing ribbon motion include optically sensing the movement of a hole in the ribbon fabric and optically sensing the motion of a flag attached to an idler roller in the ribbon path (see U.S. Pat. No. 4,988,224 by Furrow and Johenning). These means for sensing ribbon motion are undesirable because of 1) a hole requires a modification to the ribbon fabric increasing fabric cost 2) sensing a hole in the ribbon fabric can introduce long delays in detecting failed ribbon motion which can cause loss of print data and or damage to the print head/print mechanism 3) hole/s in the ribbon fabric can reduce printer print speed performance since it is not desirable to print in the hole. Printing must be suspended for a period of time to allow the hole to pass the print zone before printing can resume, and 4) Optical sensors can malfunction due to contamination such as paper and ribbon dust that are present in impact printers.

BRIEF DESCRIPTION OF THE DRAWINGS

The objects of the invention and the invention will be more fully understood when the description is read in conjunction with the drawings, wherein:

FIG. 1 is a is a schematic illustration of a radially positioned member and the associated signal pattern that is generated by the radially positioned member rotating about a central axis;

FIG. 2 is a is a schematic illustration of an alternate embodiment of a radially positioned member and the associated signal pattern that is generated by the alternate radially positioned member;

FIG. 3 is a is a schematic illustration of a further radially positioned member and the associated signal pattern that is generated by the further radially positioned member;

FIG. 4 is a is a schematic illustration of a further alternate radially positioned member and the associated signal pattern that is generated by the further alternate radially positioned member;

SUMMARY OF THE INVENTION

Figure 5:
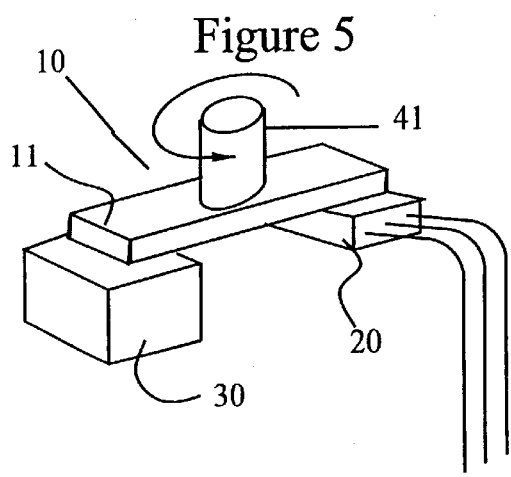
FIG. 5 is a perspective illustration of a first position of the motion detector in accordance with the present invention showing the rotating member, magnet, and detection device.

It has now been found that ribbon motion, as well as speed and type of ribbon in the printer device, can be detected by a magnetic system. Further the device can determine that a ribbon cartridge is installed in the printer and is in position and ready for use. The magnetic detection method produces a detectable signal that is more tolerant of environmental tolerances than previously disclosed ribbon detection systems. Among the advantages of a magnetic detection method over an optical system is the ability to have one or more parameters in the detection means. Additionally, magnetic detection is not subject to light infiltration, dust, or dirt.

With the system of the present invention, if ribbon motion is not detected due to ribbon failure or other point of failure, the printer logic will note the failure and printing can be stopped. This is critical in applications where the user does not want to lose printed data. If printing is halted, critical data may be retained in the computer or printer memory until the fault is cleared. Also, extended, unattended printing will not continue when the printer logic senses no motion.

The need for a more highly defined, quick action signal is satisfied by the system of the present invention. Further, the present invention provides a mechanism for producing distinct signals characteristic of the specific ribbon.

The present invention employs the generation of an electric potential perpendicular to both an electric current flowing along a conducting material and an external magnetic field applied at right angles to the current upon application of the magnetic field (Hall Effect), to provide a printer ribbon movement signal. Hall Effect sensors are used in many industrial and commercial applications and the sensor technology is well known. The design of the present invention employs a method of detection in which a flux carrying radially positioned member, preferably a bar or spoke, forms a magnetic bridge from a detector (Hall Effect sensor) to a magnet located some distance from the detector. Alternatively, the magnet is embedded in the detector and the radially positioned does not act as bridge but simply provides a magnetic flux change. Each method allows the expensive detector and magnet to be located on the printer, and the inexpensive radially positioned member to be a part of the disposable ribbon cartridge. The radially positioned member is attached to a rotatable part of the ribbon cartridge. The system of the present invention provides a path for magnetic flux to pass through the radially positioned member and emerge at the detector area with sufficient flux to trigger the Hall Effect sensor. The radially positioned member provides a path that concentrates the magnetic field.

The basic ribbon cartridge mechanism is not narrowly critical and can, for example, be of the type disclosed in various patents, such as U.S. Pat. Nos. 4,988,224, 4,630,948, 4,568,209 or 3,989,132, the disclosures of which is incorporated herein, as though recited in full.

DESCRIPTION OF THE PREFERRED EMBODIMENTS OF THE INVENTION

The proposed design uses the motion of the ribbon to drive the detection system. As shown in FIGS. 5–8, the motion detector 1 includes a rotator member 10 having at least one radially positioned member 11, a detector member 20, and a magnet 30. The radially positioned member 11 of rotator member 10 is made of a metal that will pass magnetic flux and includes at least one metal spoke 12. As shown in FIGS. 1–4, the radially positioned member 11 can include any mechanically and magnetically practical number of spokes 12. However, where the radially positioned member is bridging the magnet 30 to detector member 20, there must be an even number of spokes 12. In alternative embodiments, where bridging is not necessary, the number of spokes can be even or odd. Each radially positioned member having a different number of spokes produces a different magnetic signal as also illustrated in FIGS. 1–4. In a preferred embodiment of the invention, the detector member 20 is a Hall Effect Sensor and the detector member 20 and the magnet 30 are in close proximity to one another and to rotator member 10.

Rotator member 10 is mounted for movement with axially extending member 41 (FIGS. 5 and 7) within print ribbon cartridge 40. The proximal end of axially extending member 41 is fixed to rotator member 10 while the distal end of axially extending member 41 is fixed within print ribbon cartridge 40. A print ribbon is mounted for movement within print ribbon cartridge 40. Motion is detected when the ribbon travels around or through a motion translator member where linear motion of the ribbon is translated into rotary motion of the axially extending member 41, which in turn rotates rotator member 10, which is comprised of a roller or a gear, or any other means within the ability of one skilled in the art. Attached to the gear or roller of rotator member 10 is a radially positioned magnetic-flux-carrying member having a single bar or a pattern of radial spokes to create different detectable patterns of magnetic detection signals. The spokes 12 or the bar 14 pass in close proximity to the sensor system. At specific angles of rotation the magnetic field 31 is entered, changing the flux or magnetic strength to the detector member 20. Changing the magnetic path is a mechanism for causing the detector member 20 to generate signals.

Figure 6:
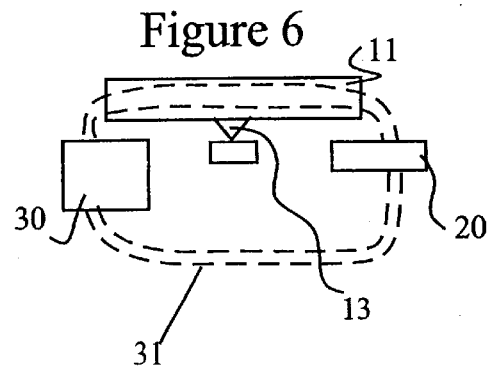
FIG. 6 is a schematic illustration of a flux pattern corresponding to the illustration of FIG. 5.
Figure 7:
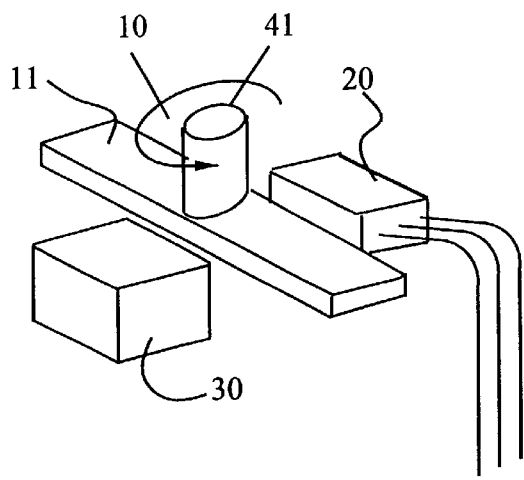
FIG. 7 is a perspective illustration of a non-bridged position of the motion detector in accordance with the present invention when the flux path is removed.
Figure 8:
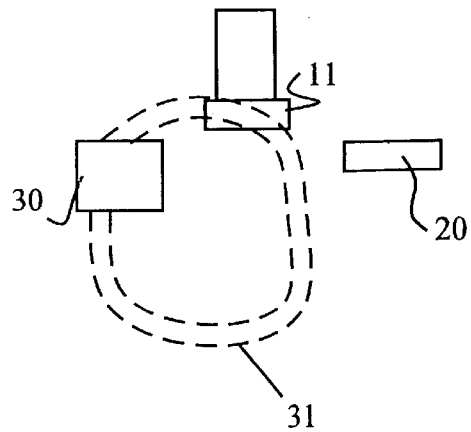
FIG. 8 is a schematic illustration of a flux pattern corresponding to the illustration of FIG. 7.
Figure 9:
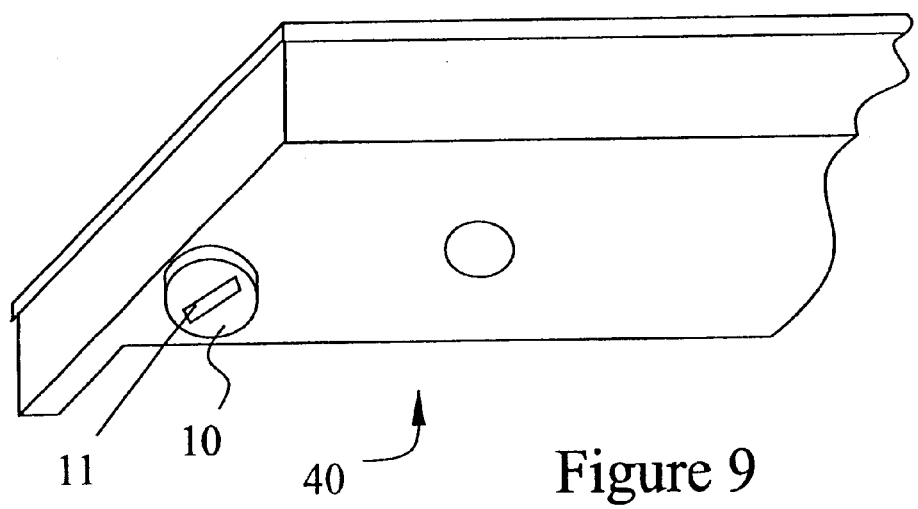
FIG. 9 is a fragmentary perspective exploded bottom view, of a ribbon cartridge and detector system.
Figure 10:
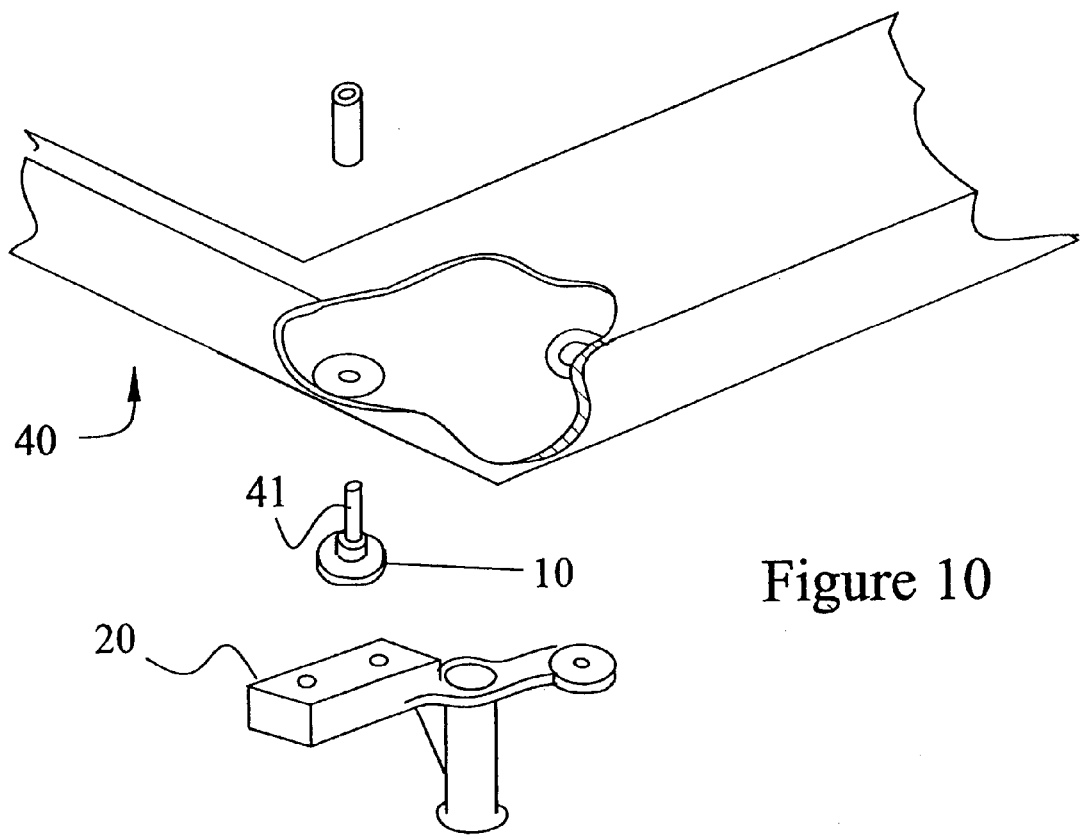
FIG. 10 is a fragmentary perspective exploded top view, of a ribbon cartridge and detector system.

The motion of the printer ribbon causes the rotator member 10 to rotate producing magnetic flux changes at a rate of at least two changes per second, or at a rate sufficient to allow detection within one line of print at the printing speed. During the rotation, the metal spokes 12 of radially positioned member 11 pass over the magnet 30 and detector member 20 thereby producing a changing magnetic flux that is detected by the detector member. As shown in FIG. 6, when radially positioned member 11 magnetically bridges magnet 30 to detector member 20, detector member 20 detects the change in magnetic flux 31. However, when radially positioned member 11 is in such a position that does not bridge magnet 30 to detector member 20, magnetic flux 31 is not detected by the detector member 20. The sequence and timing produced by the rotation of the rotator member 10 provides a unique signal pattern that is passed to the printer device logic by the detector member 20.

Figure 16:
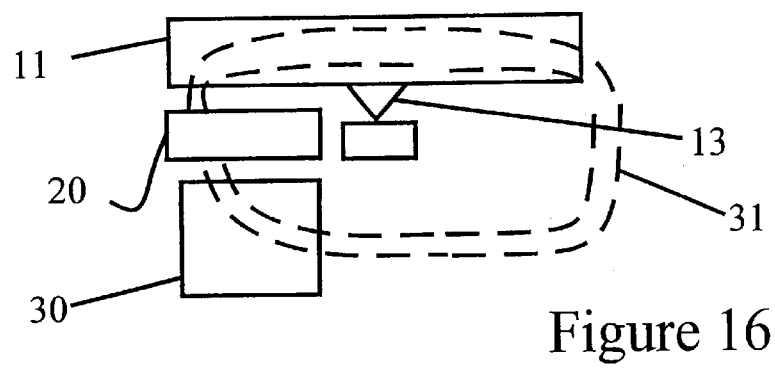
FIG. 16 is a schematic illustration of a flux pattern corresponding to a further embodiment of a detector system.
Figure 18:
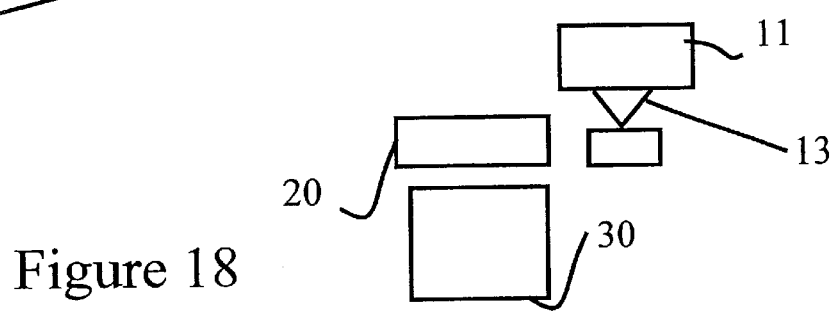
FIG. 18 is a perspective illustration of a second position of a further embodiment of a detector system in accordance with the present invention.

A critical feature of the detection system is the use of a point bearing 13 to minimize friction due to rotation, as shown in FIGS. 16 and 18. The point bearing 13 is at the center of the rotator member 10 in the printer ribbon cartridge 40. For the magnet 30 and radially positioned member 11 to operate most effectively, close tolerances should be maintained. The use of the point bearing 13, set at a specific distance height, establishes a proper setting. The magnetic force acting on the radially positioned member 11 could, if subjected to tolerance variations, cause the rotating member 10 to drag on the detection member 20 and/or the magnet 30. This problem is eliminated through the use of the raised point bearing 13.

Figure 11:
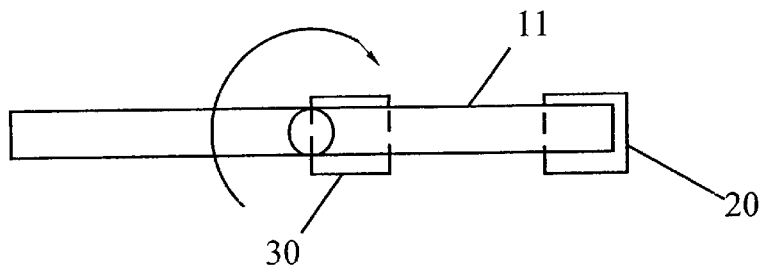
FIG. 11 is a schematic illustration of a top view of a detector system.
Figure 11A:
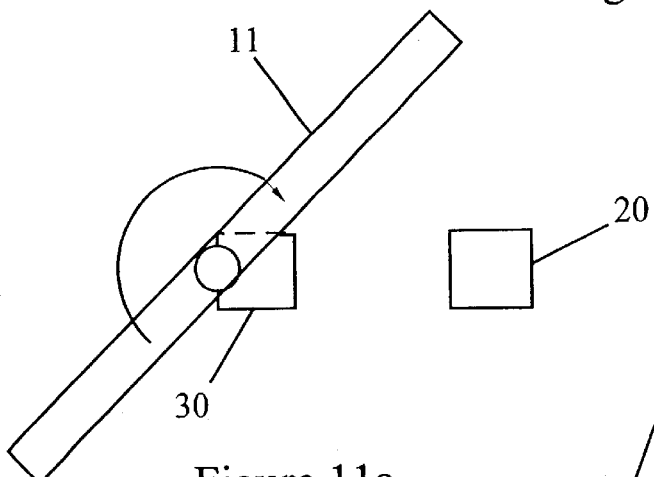
FIG. 11a is a schematic illustration of the top view of FIG. 11 with the radially positioned member rotated 45 degrees.
Figure 12:
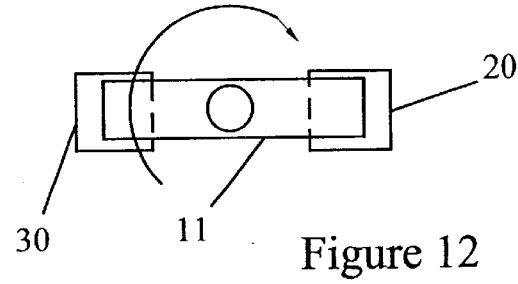
FIG. 12 is a schematic illustration of a top view of an alternate embodiment of a detector system.
Figure 12A:
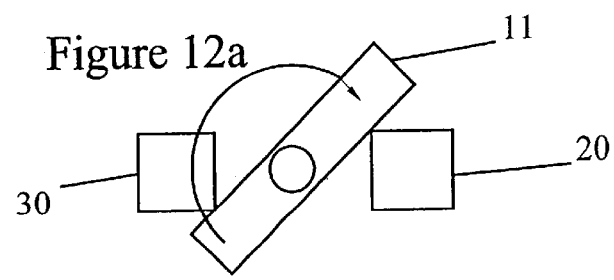
FIG. 12a is a schematic illustration of a top view of an alternate embodiment of FIG. 12 with the radially positioned member rotated a quarter turn.

As illustrated in FIGS. 11 and 12, the rotator member 10 rotates relative to the magnet 30 and detector member 20, but the location of the center of rotation is not narrowly critical. The radially positioned member is of sufficient length to overcome manufacturer error in the positioning of rotator member 10 and user error in placement of the cartridge; therefore, rotator member 10 can be slightly out of the preferred position and still perform optimally. Where the center of rotation is between magnet 30 and detector member 20, the rotator member 10 would have the minimum dimensions. By way of contrast, as evident from FIGS. 11a and 12a, the positioning of the center of rotation at magnet 30 or detector member 20 results in a larger sized rotator member 10 and a greater amount of motion of the spokes 12 per revolution, relative to magnet 30 or detector member 20. In the system of FIG. 11a, a quarter turn moves radially positioned member 11 somewhat away from detector member 20. In the system of FIG. 12a, a quarter turn moves radially positioned member 11 a substantial distance from detector member 20. Thus, in the system of FIGS. 12 and 12a the transition from on to off, is faster and more distinctive than in the system of FIGS. 11 and 11a. At the half way mark, there would be no significant difference between the two embodiments of the invention. As the number of spokes that form bridges from detector member 20 to magnet 30 increases, the dimensions of the spokes 12 and the location of the center of rotation become more significant.

To operate optimally, the detector device must recognize a predetermined signal, or a proper sequence of signals, or a fault will be noted by the printer logic. If an incorrect ribbon cartridge is loaded into the printer, the detector device will not recognize the predetermined signal or signals and, therefore, a fault will be noted by the printer logic. Further, if a user tries to print when there is no printer ribbon cartridge loaded in the printer, the detector member will not detect the necessary signal or signals and therefore a fault will also be noted by the printer logic.

In addition to detecting that the ribbon cartridge is present and is the correct cartridge for the printer, the system enables the use of special purpose cartridges, since the printer will be able to recognize the cartridge and can be set to a specific printer mode corresponding to the special purpose cartridge. For example, a multi-color ribbon could be differentiated from a black ribbon. The special purpose cartridges are encoded using a specific pattern for the spokes of the radially positioned member by varying the width, number and shape of the spokes. Such unique radially positioned members are illustrated in FIGS. 13–15.

Figures 13, 13A, 14, 14A, 15, 15A:
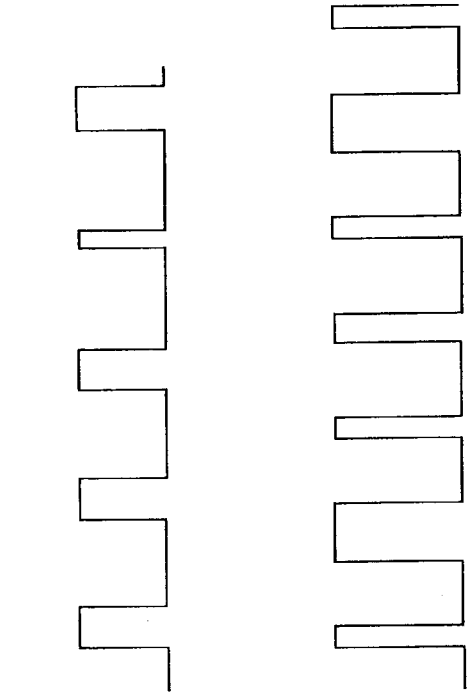
FIG. 13 illustrates a radially positioned member having three similar spokes and one narrow spoke.
FIG. 13a illustrates the signal pattern that is associated with the embodiment of FIG. 13.
FIG. 14 illustrates a radially positioned member having three similar spokes and one wide spoke.
FIG. 14a illustrates the signal pattern that is associated with the embodiment of FIG. 14.
FIG. 15 illustrates a radially positioned member having two similar wide spokes and two similar narrow different spokes.
FIG. 15a illustrates the signal pattern that is associated with the embodiment of FIG. 15.

FIG. 13 is an illustration of an embodiment of a spoke design of a radially positioned member in which there are three similar wide spokes and a single narrow spoke. As illustrated in FIG. 13a, the modification of FIG. 13 generates a signal pattern having a signature characterized by three longer duration signals and a single shorter signal.

FIG. 14 is an illustration of still another embodiment of a spoke design in which there are three similar narrow spokes and a single wide spoke. As illustrated in FIG. 14a, the modification of FIG. 14 generates a signal pattern having a signature characterized by three shorter duration signals and a single longer signal.

FIG. 15 is an illustration of a further embodiment of a spoke design in which there is a pair of adjacent wide spokes and a pair of adjacent narrow spokes. As illustrated in FIG. 15a, the modification of FIG. 15 generates a signal pattern having a signature characterized by two longer duration signals followed by two shorter duration signals.

It should be noted that the actual shape of the curve for each signal pattern will vary depending on the strength of the material used for the spokes, the number of spokes, etc. The curves used in the Figures are used for simplicity.

It should be readily apparent that any combination of spoke patterns and designs within mechanical and magnetic limits can be used, with larger numbers of spokes providing larger combinations of signal patterns. The signal pattern is deciphered in the computerized printer to verify that the correct ribbon has been installed in the printer, or that a specific ribbon has been installed in the printer. It should be noted that while rectangular spokes have been illustrated, other shapes could be employed, within the scope of the present invention. For example, in the embodiment of FIG. 14, the wide spoke can be pear shaped with the wide portion distal of the center of the radially positioned member. This modification would vary the pulse width of the signal and would provide signals of varying peak durations, but would not optimize the sharp demarcation between adjacent spokes. That is, the sharp rise and fall of the signal pattern could be diminished.

Figure 17:
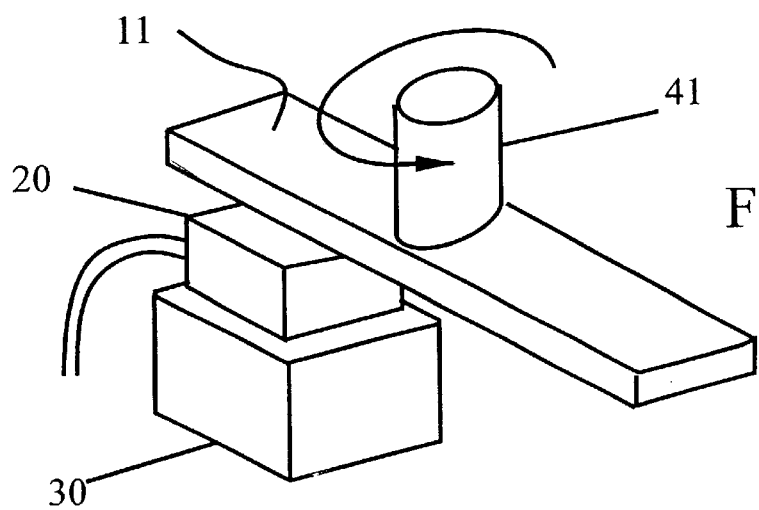
FIG. 17 is a perspective illustration of a first position of a further embodiment of a detector system in accordance with the present invention.

FIGS. 16, 17, and 18 show a further embodiment of the present invention wherein magnet 30 is embedded in detector member 20, thereby forming a magnet-detector unit 40, sometimes referred to as a "gear tooth detector", and a radially positioned member 11 containing at least one spoke 12 mounted on a rotating element 35. Rotating element 35 is preferably a gear. This embodiment allows the ribbon motion to indirectly drive the radially positioned member 11. Gear 35 is moved by interaction with other gears that are set in motion by the ribbon. As the gears interact, gear 35 is rotated, thereby rotating radially positioned member 11. In this embodiment the number of spokes can be even or odd.

As shown in FIG. 16 of this embodiment, magnet-detector unit 40 senses the presence of metal when radially positioned member 11 is aligned with or in close proximity to magnet-detector unit 40. When radially positioned member 11 moves out of alignment or proximity of magnet-detector unit 40, as shown in FIG. 18, the unit senses the absence of metal. This movement of the radially positioned member 11 produces a change in magnetic flux, which is transferred to the printer logic as noted in previous embodiments.

Although the use of the motion detection system is uniquely applicable to the monitoring the functioning of a printer ribbon, the system can have other uses. By way of example, the system could be used to monitor the rotation of belts, conveyors, gears, and rotors for various applications.

The invention has been described in detail in the specification for the purpose of illustration. It is to be understood that variations can be made therein by those skilled in the art without departing from the spirit and scope of the invention.

What is claimed is:

1. A motion detector comprising,
    a rotator member having at least one radially positioned member and being mounted for rotation from at least a first position to at least a second position;
    a detector member, said detector member being a Hall Effect sensor;
    a magnet, said magnet producing a magnetic field;
    wherein, said radially positioned member is characterized by altering the magnetic flux of said magnetic field when it moves into and out of proximity to said magnet; and
    wherein said detector member detects the alteration of said magnetic flux.

2. The motion detector of claim 1 wherein, said rotator member is a gear.

3. The motion detector of claim 1 wherein, in said first position said at least one radially positioned member magnetically bridges said magnet and said detector member such that said magnetic field has a first magnetic field strength; and
    wherein, in said second position said at least one radially positioned member does not bridge said magnet and said detector member, thereby measurably changing said first magnetic field strength to a second magnetic field strength.

4. The motion detector of claim 1 wherein, said magnet is embedded in said detector member.

5. The motion detector of claim 4 wherein, in said first position said at least one radially positioned member is aligned with said magnet and said detector member such that said magnetic field has a first magnetic field strength; and wherein, in said second position said at least one radially positioned member is not aligned with said magnet and said detector member, thereby measurably changing said first magnetic field strength to a second magnetic field strength.

6. The motion detector system of claim 1, further comprising,
    a print ribbon cartridge;
    a print ribbon mounted for movement within said cartridge;
    an axially extending member having a proximal end fixed to said rotator member and a distal end within said cartridge wherein said rotator member is mounted for movement with said axially extending member; and
    a motion translator member for translating linear motion of said ribbon to rotation motions of said axially extending member.

7. The motion detector system of claim 1, wherein said rotator member has a centrally positioned point bearing, wherein said point bearing minimizes friction due to rotation of said rotator member.

8. The motion detector system of claim 7, wherein said point bearing maintains said rotator member at a predetermined distance from said detector member.

9. The motion detector system of claim 7, wherein said point bearing maintains said rotator at a predetermined distance from said magnet.

10. The motion detection system of claim 6, wherein the absence of a magnetic flux change for a predetermined period of time generates a ribbon non-motion fault signal.

11. The motion detection system of claim 6, wherein the absence of a magnetic flux change for a predetermined period of time generates a no ribbon installed signal.

12. The motion detection system of claim 6, wherein said detector member generates signals that are relative to the speed of movement of said ribbon.

13. The motion detection system of claim 12, wherein said rotator member produces magnetic flux changes at a rate of at least two changes per second.

14. The motion detection system of claim 6, further comprising a printer logic member, said printer logic member receiving digitized signals from said detector.

15. The motion detection system of claim 1, wherein the rotation of said rotator member generates a specific sequence of data in relation to the dimensions of each of said at least one radially positioned members.

16. The motion detection system of claim 15, wherein the absence of a specific sequence of data generates a ribbon fault signal that signifies the presence of an incorrect print ribbon.

17. The motion detection system of claim 15, wherein the absence of a specific sequence of data generates a ribbon fault signal that signifies the absence of print ribbon.

18. The motion detection system of claim 15, wherein said at least one radially positioned member is a plurality of radially positioned members having at least two different shapes, thereby generating at least two different signals.

19. The motion detection system of claim 3, wherein each of said at least one radially positioned member is a spoke.

20. The motion detection system of claim 5, wherein each of said radially positioned member is a spoke.

21. The motion detection system of claim 19, wherein said rotator member contains an even number of spokes.

22. The motion detection system of claim 15, wherein said detector member generates signals that are relative to the width of each said at least one radially positioned member.

23. The motion detection system of claim 15, wherein said detector member generates signals that are relative to the shape of each of said at least one radially positioned member.

24. The motion detection system of claim 21, wherein said rotator member contains at least four spokes, each of said spokes extending in a non-uniform pattern, wherein said non-uniform pattern represents a printer ribbon identification code.

25. The motion detection system of claim 19, wherein said spokes of said rotator member rotate with the motion of a print ribbon mounted within a print ribbon cartridge,
said spoke being mounted for rotation in close proximity to said magnet and said detector member,
said detector member being a Hall Effect sensor, and
said magnet being positioned a predetermined distance from said detector member,
wherein, as said spokes rotate in position over said detector member, the magnetic flux between said magnet and said detector member is altered by the presence and absence of said spokes, thereby creating a magnetic field change detectable by said Hall Effect sensor.

26. A magnetic detection system comprising, a magnet,
a rotator member, said rotator member having at least one radially positioned member, said at least one radially positioned member being characterized by altering a magnetic field when it moves into and out of proximity to said magnet, and
a detector member, said detector member being a Hall Effect sensor,
wherein, said rotator member is mounted for rotation from at least a first position to at least a second position, in said first position said at least one radially positioned member magnetically bridges said magnet and said detector member such that said magnetic field has a first magnetic field strength, and in said second position said at least one radially positioned member does not bridge said magnet and said detector member such that said magnetic field has a measurably changed magnetic field strength, whereby a plurality of signals are generated for each rotation of said rotator member.

27. A method of detecting motion of a printer ribbon comprising, rotating a rotator member having at least one radially positioned member into and out of proximity to a magnet and a detector member, thereby altering a magnetic flux of a magnetic field produced by said magnet, wherein said detector member detects the alteration of said magnetic flux and transfers the detections to a printer logic, wherein said printer logic notes any failures or interruptions to the alteration detection, thereby determining the motion of the printer ribbon.

28. The method of claim 27, said detector member being a Hall Effect sensor, said rotator member being mounted for rotation from at least a first position to at least a second position, wherein in said first position said radially positioned member magnetically bridges said magnet and said detector member such that said magnetic field has a first magnetic field strength, and in said second position said magnetic field is measurably changed to a second magnetic field strength.

29. The method of claim 27, said detector member being a Hall Effect sensor and said magnet being embedded within said detector member thereby forming a magnet-detector unit, said rotator member being mounted for rotation from at least a first position to at least a second position, wherein in said first position said radially positioned member is aligned with said magnet-detector unit such that said magnetic field has a first magnetic field strength, and wherein in said second position said at least one radially positioned member is not aligned with said magnet-detector unit such that said magnetic field is measurably changed to a second magnetic field strength.

30. The method of claim 28, wherein said measurably changed magnetic field strength changes sharply from a high strength to a low strength.

31. The method of claim 27, wherein said at least one radially positioned member contains at least one spoke.

32. The method of claim 27, wherein said detector member generates signals relative to the speed of movement of said ribbon.

33. The method of claim 27, wherein rotating said radially positioned member produces magnetic flux changes at a rate of at least two changes per second.

34. The method of claim 31, further comprising the step of generating a specific sequence of data in relation to changes in said magnetic field strengths.

35. The method of claim 34 wherein, said specific sequence of data is determined by the width and shape of each of said at least one spoke.

36. The method of claim 27, wherein the absence of a specific sequence of data generates a ribbon fault signal that signifies the presence of an incorrect print ribbon.

37. The method of claim 27, wherein the absence of a measurably changed magnetic field strength for a predetermined period of time generates a non-motion fault signal.

38. A printer ribbon cartridge comprising, a rotator member, said rotator member having at least one radially positioned member, said radially positioned member being characterized by altering a magnetic field when it moves into and out of proximity of at least one magnet and a Hall Effect sensor, said rotator member being mounted for rotation from at least a first position to at least a second position, wherein in said first position said at least one radially positioned member magnetically bridges said magnet and said sensor and in said second position said at least one radially positioned member does not bridge said magnet and said sensor.

39. The printer ribbon cartridge of claim 38, wherein said rotator member has a plurality of radially positioned members adapted to alter said magnetic field when rotated.

40. The printer ribbon cartridge of claim 38, wherein said radially positioned member contains at least one spoke having at least two different shapes capable of generating at least two different signals when in bridging relationship to a Hall Effect sensor and a magnet.

41. The printer ribbon cartridge of claim 38, wherein said rotator member contains at least two spokes.

42. The motion detection system of claim 40, wherein at least one of said spokes extends in a non-uniform pattern with respect to the other spokes, wherein said non-uniform pattern represents a printer ribbon identification code.

43. A motion detector comprising, a rotator member having at least one radially positioned member and being mounted for rotation from at least a first position to at least a second position;

a detector member, said detector member being a Hall Effect sensor;

a magnet, said magnet producing a magnetic field and being embedded within said detector member thereby forming a magnet-detector unit;

wherein, said at least one radially positioned member is characterized by altering said magnetic field when it moves into and out of proximity to said magnet-detector unit;

wherein, in said first position said at least one radially positioned member is aligned with said magnet-detector unit such that said magnet-detector unit senses the presence of said at least one radially positioned unit; and wherein, in said second position said at least one radially positioned member is not aligned with said magnet-detector unit such that said magnet-detector unit senses the absence of said at least one radially positioned unit.

44. The motion detector of claim 43 wherein said rotator member is a gear.

* * * * *